(12) United States Patent
Chang et al.

(10) Patent No.: US 8,373,993 B2
(45) Date of Patent: Feb. 12, 2013

(54) HINGE ASSEMBLY AND PORTALE ELECTRONIC DEVICE USING THE SAME

(75) Inventors: Shu-Wei Chang, Tu-Cheng (TW); Fu-Hsiung Yang, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 218 days.

(21) Appl. No.: 12/902,227

(22) Filed: Oct. 12, 2010

(65) Prior Publication Data

US 2011/0267785 A1    Nov. 3, 2011

(30) Foreign Application Priority Data

Apr. 29, 2010   (TW) .................................. 99113755

(51) Int. Cl.
*H05K 5/00* (2006.01)

(52) U.S. Cl. ........................................ 361/752; 361/759

(58) Field of Classification Search .................. 361/755, 361/759; 16/223; 455/575.3
See application file for complete search history.

(56) References Cited

U.S. PATENT DOCUMENTS

| | | | | |
|---|---|---|---|---|
| 5,832,080 A | * | 11/1998 | Beutler et al. | ........... 379/433.13 |
| 6,421,547 B1 | * | 7/2002 | Frohlund et al. | ........... 455/575.3 |
| 7,908,715 B2 | * | 3/2011 | Ogatsu | ............................. 24/3.1 |
| 2008/0061058 A1 | * | 3/2008 | Wang et al. | ................... 220/4.02 |
| 2010/0079967 A1 | * | 4/2010 | Hiraoka | ........................ 361/803 |

* cited by examiner

*Primary Examiner* — Yuriy Semenenko
(74) *Attorney, Agent, or Firm* — Altis Law Group, Inc.

(57) ABSTRACT

A hinge assembly includes an axle portion having first and second ends, a first hinged portion, a second hinged portion, and at least one conductive member. The first hinged portion is inserted into one end of the axle portion. The other end of the axle portion is received the second hinged portion. The conductive member is positioned between the axle portion and one of the first hinged portion and the second hinged portion.

6 Claims, 5 Drawing Sheets

| Frequency (MHz) | TRP of the antenna (dBm) | |
|---|---|---|
| | Hinge assembly without conductive members | Hinge assembly with conductive members |
| 1013 | 19.1 | 20.6 |
| 384 | 18.5 | 19.8 |
| 777 | 18.2 | 19.6 |

FIG. 5

HINGE ASSEMBLY AND PORTALE ELECTRONIC DEVICE USING THE SAME

BACKGROUND

1. Technical Field

The disclosure generally relates to hinge assemblies, particularly to a hinge assembly used on a flip type portable electronic device.

2. Description of Related Art

Commonly, a flip type portable electronic device includes a main body, a cover, and a hinge rotatably assembled the cover to the main body. The cover is usually electrically connected to a circuit board mounted in the main body by a flexible printed circuit board. However, over time because of wear and tear, the connection between the cover and the main body may become unreliable or cease working altogether.

In addition, the flip type portable electronic device usually further includes an antenna mounted in the main body to transmit/receive signals. When the cover has a bad connection with the circuit board of the main body, the members therein such as the LCD may interfere with the antenna, and lower total radiated power (TRP) and total isotropic sensitivity (TIS) of the antenna.

Therefore, there is room for improvement within the art.

BRIEF DESCRIPTION OF THE DRAWINGS

Many aspects of the hinge assembly and portable electronic device using the same can be better understood with reference to the following drawings. The components in the drawings are not necessarily drawn to scale, the emphasis instead being placed upon clearly illustrating the principles of the hinge assembly and portable electronic device using the same.

FIG. 5 is TRP table comparing performance of an antenna of the portable electronic device of FIG. 1 with the conductive members received in the hinge assembly and without.

DETAILED DESCRIPTION

Figure 1:
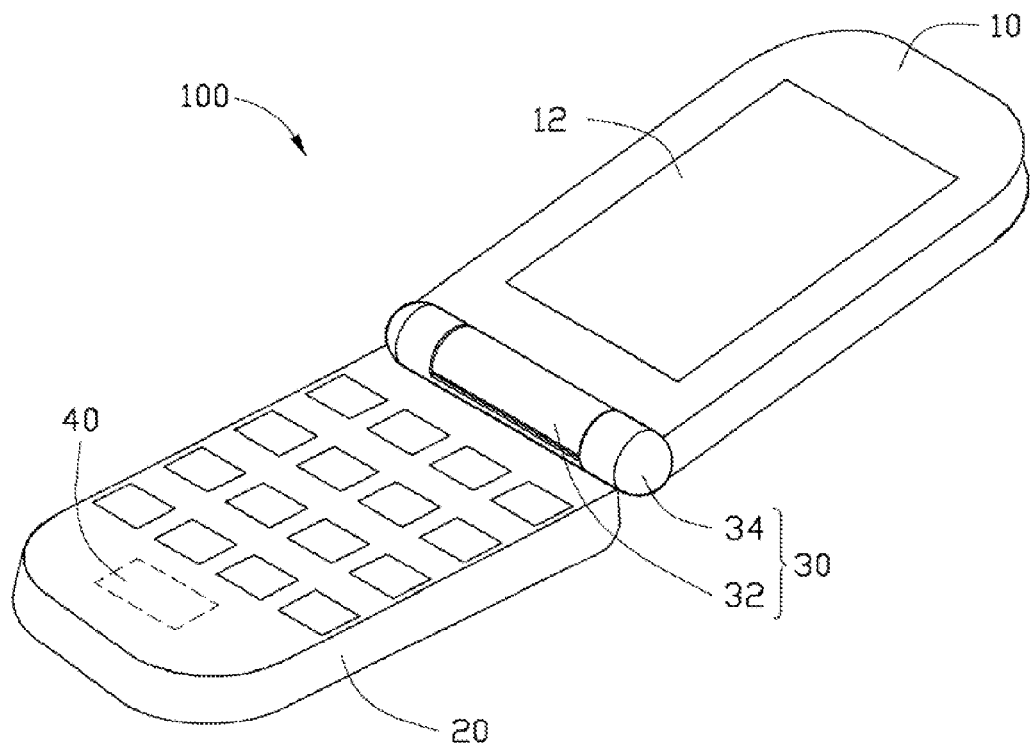
FIG. 1 is a schematic view of a portable electronic device employed with a hinge assembly, according to an exemplary embodiment.
Figure 2:
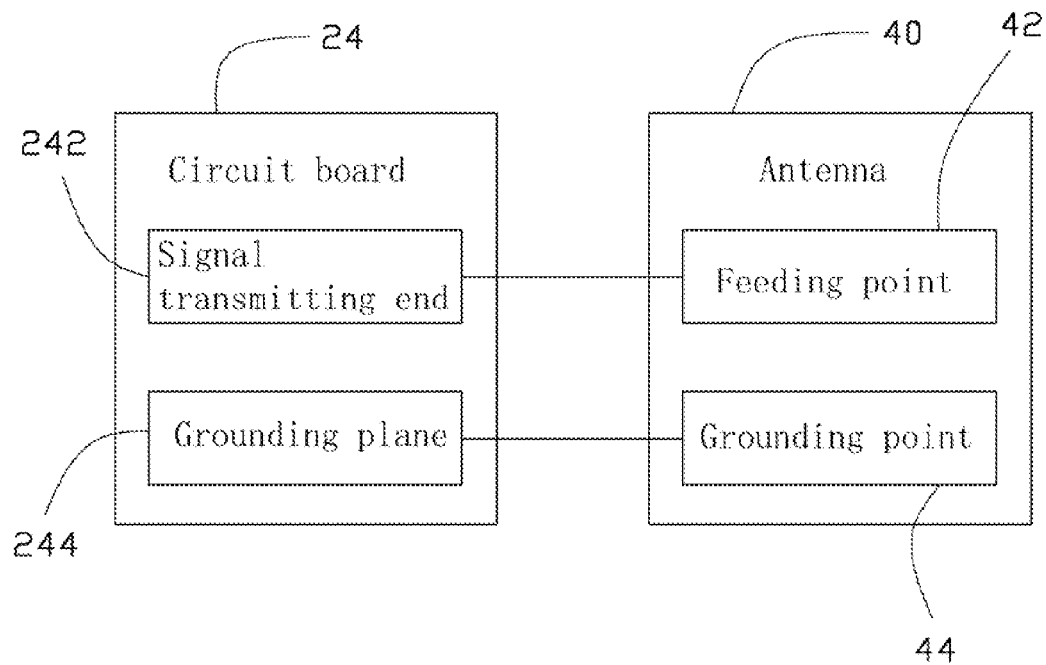
FIG. 2 is a block diagram of a circuit board and an antenna of the portable electronic device of FIG. 1.
Figure 3:
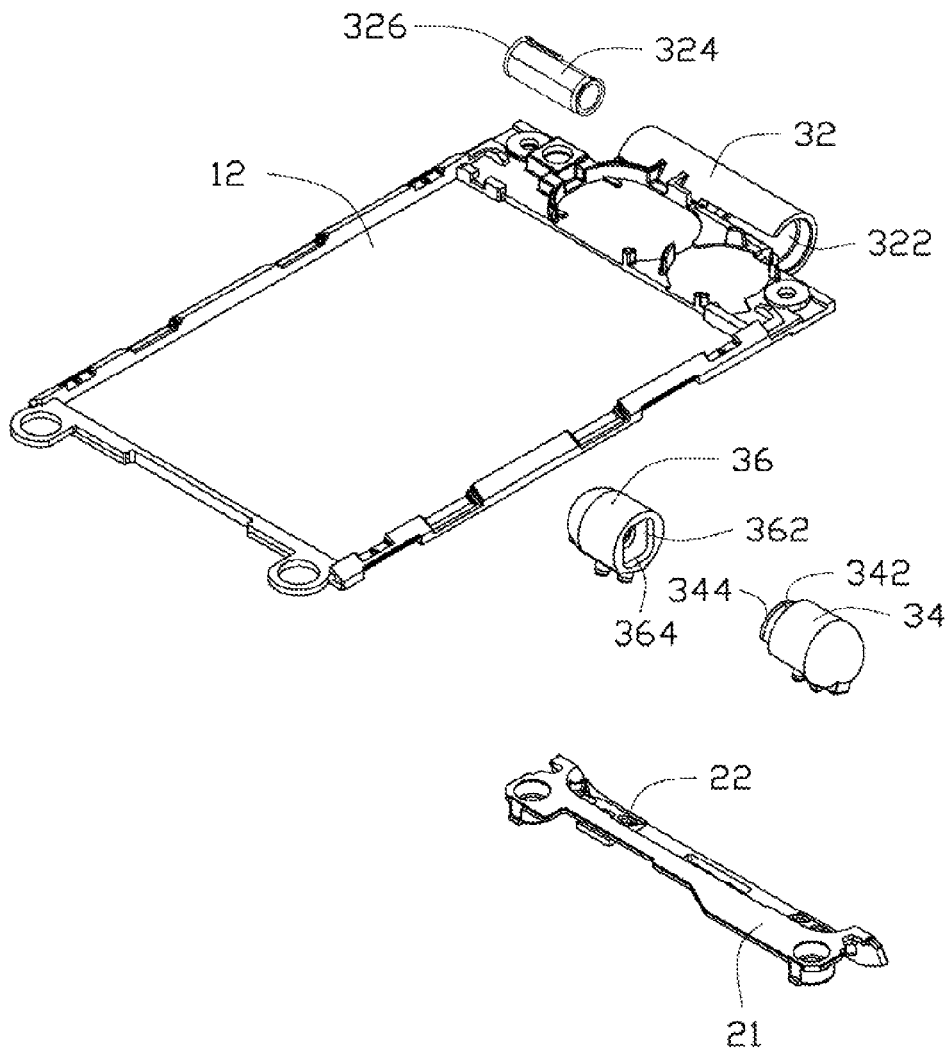
FIG. 3 is a partially disassembled view of the portable electronic device of FIG. 1, without conductive members being received in the hinge assembly.

Referring to FIGS. 1, 2, and 3, a portable electronic device 100 which may be a mobile phone or a personal digital assistant (PDA), according to one exemplary embodiment, includes a cover 10, a main body 20, a hinge assembly 30, and an antenna 40 (schematically shown in FIG. 2). The cover 10 and the main body 20 are rotatably connected to each other by the hinge assembly 30. The antenna 40 is mounted in the main body 20.

The cover 10 includes a liquid crystal display (LCD) 12 mounted therein. The main body 20 includes a mounting portion 21 (shown in FIG. 3) positioned at an end adjacent to the cover 10. The mounting portion 21 is metallic. A receiving space 22 is defined in the mounting portion 21 to mount the hinge assembly 30.

A circuit board 24 (schematically shown) is mounted in the main body 20. The circuit board 24 includes a signal transmitting end 242 and a grounding plane 244. The antenna 40 includes a feeding point 42 and a grounding point 44. The feeding point 42 and the grounding point 44 are respectively electrically connected to the signal transmitting end 242 and the grounding plane 244.

Figure 4:
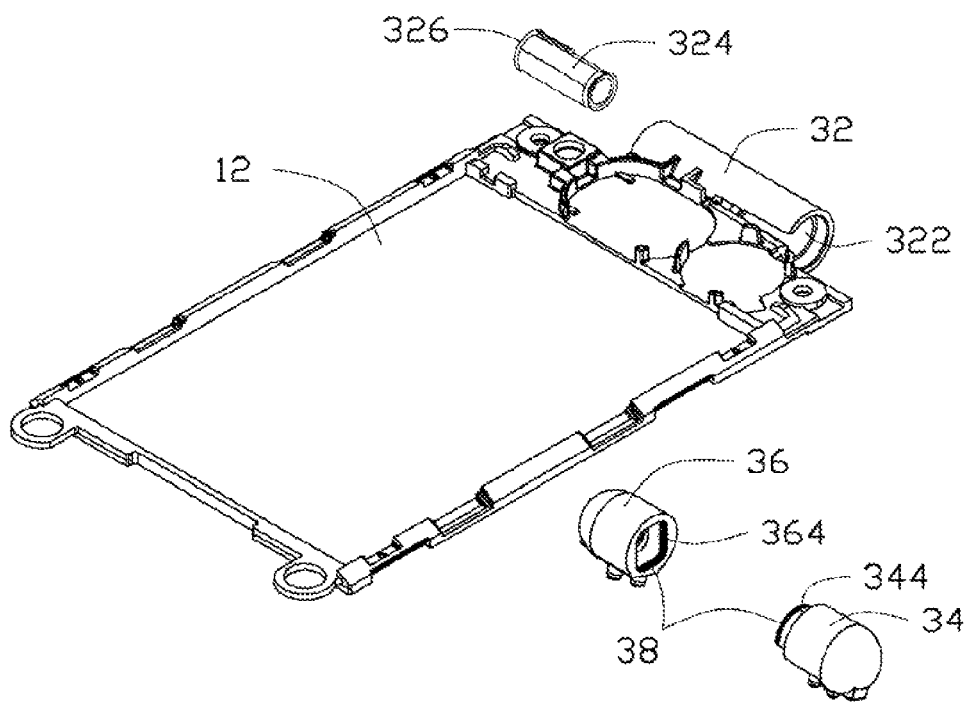
FIG. 4 is a partially disassembled view of the portable electronic device of FIG. 1, having conductive members received in the hinge assembly.

Also referring to FIG. 4, the hinge assembly 30 includes an axle portion 32, a first hinged portion 34, a second hinged portion 36, and at least one conductive member 38. The axle portion 32 is conductive and includes a sleeve 322 and an axle 324. The sleeve 322 is substantially a hollow cylinder secured to the cover 10 at an end adjacent to the main body 20. The axle 324 is substantially cylindrical and has a rib 326 protruding from one end thereof. The axle 324 can be inserted into the sleeve 322 until the rib 326 abuts against an end of the sleeve 322.

The first and second hinged portions 34, 36 are substantially cylinders. The first and second hinged portions 34, 36 are respectively secured at two opposites ends of the receiving space 22 and electrically connected to the grounding plane 244. A protrusion 342 protrudes from one end of the first hinged portion 34 facing the second hinged portion 36. A first receiving slot 344 is defined in the protrusion 342 around an outer surface thereof. An opening 362 is defined in the second hinged portion 36 facing the first hinged portion 34. A step-like second receiving slot 364 is defined in an inner surface of the second hinged portion 36 around the opening 362. The protrusion 342 can be received in one end of the sleeve 322. The rib 326 of the axle 324 can be received in the second receiving slot 364 after the axle 324 is inserted into the other end of the sleeve 322.

The two conductive members 38 are conductive and elastic. In this exemplary embodiment, the conductive members 38 are conductive foam. The two conductive members 38 are respectively fit into the first and second receiving slots 344, 364. When the protrusion 342 is received in one end of the sleeve 322 and the rib 326 of the axle 324 is received in the second receiving slot 364, the two conductive members 38 contact the sleeve 322 and the axle 324.

In assembly, the first hinged portion 34 is secured to the mounting portion 21 at one end thereof. The protrusion 342 is inserted into one end of the sleeve 32. The axle 324 is received in the sleeve 32 from the other end of the first hinged portion 34 until the rib 326 abuts against the end of the sleeve 32. The second hinged portion 36 is secured to the mounting portion 21 at an end opposite to the first hinged portion 34. The rib 326 of the axle 324 is received in the second receiving slot 364. The cover 10 is rotatably connected to the main body 20 by the hinge assembly 30. The two conductive members 38 positioned between the axle portion 32 and the first and second hinged portion 34, 36 establish a stable and dependable electrical connection between the cover 10 and the main body 20 that can last over time and resist wear and tear.

In addition, the cover 10 is also connected to the grounding plane 244 by the hinge assembly 30. Therefore, electrical noise generated by the LCD 12 of the cover 10 can be decreased. Referring to FIG. 5, when the conductive members 38 are received in the first and second receiving slots 344, 364, the TRP of the antenna 40 is raised at different frequencies. On the other hand, the TIS of the antenna 40 is reduced from −100 dBm to −103 dBm.

In other exemplary embodiments, to conserve on space or expense one of the conductive members 38 can be omitted, and only one conductive member 38 is received in the first receiving slot 344 or the second receiving slot 364 to establish an electrical connection between the cover 10 and the main body 20.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A hinge assembly, comprising:
   an axle portion, the axle portion comprising a sleeve and an axle, the sleeve having first and second ends, the axle comprising a rib at one end thereof, the axle received in the sleeve with the rib abutting against the second end;
   a first hinged portion, the first hinged portion comprising a protrusion protruding from one end thereof, the protrusion defining a first receiving slot at an outer surface thereof and inserted into the first end;
   a second hinged portion, the second hinged portion defining an opening at one end thereof opposite to the first hinged portion, and defining a second receiving slot at an inner surface thereof around the opening, the rib received in the second receiving slot; and
   at least one conductive member received in one of the first receiving slot and the second receiving slot and positioned between the axle portion and one of the first hinged portion and the second hinged portion.

2. The hinge assembly as claimed in claim 1, wherein the hinge assembly has two conductive members, one of the two conductive members is received in the first receiving slot, and positioned between the first hinged portion and the axle portion; the other conductive member is received in the second receiving slot, and positioned between the second hinged portion and the axle portion.

3. A portable electronic device, comprising:
   a cover;
   a main body; and
   a hinge assembly rotatablely connected the cover to the main body, the hinge assembly comprising:
   an axle portion, the axle portion comprising a sleeve and an axle, the sleeve having first and second ends and secured to the cover, the axle comprising a rib at one end thereof, the axle received in the sleeve with the rib abutting against second end;
   a first and second hinged portions secured to the main body, the first hinged portion comprising a protrusion protruding from one end thereof, the protrusion defining a first receiving slot at an outer surface thereof and inserted into the first end, the second hinged portion defining an opening at one end thereof opposite to the first hinged portion, and defining a second receiving slot at an inner surface thereof around the opening, the rib received in the second receiving slot; and
   at least one conductive member received in one of the first receiving slot and the second receiving slot and positioned between the axle portion and one of the first hinged portion and the second hinged portion.

4. The portable electronic device as claimed in claim 3, wherein the conductive members is two, one of the two conductive members is received in the first receiving slot, and positioned between the first hinged portion and the axle portion; the other conductive member is received in the second receiving slot, and positioned between the second hinged portion and the axle portion.

5. The portable electronic device as claimed in claim 4, further comprising a circuit board including a signal transmitting end and a grounding plane; wherein the first and hinged portion are electrically connected to the grounding plane.

6. The portable electronic device as claimed in claim 5, further comprising an antenna including a feeding point and grounding point; wherein the feeding point and the grounding point are respectively connected to the signal transmitting end and the grounding plane.

* * * * *